UNITED STATES PATENT OFFICE.

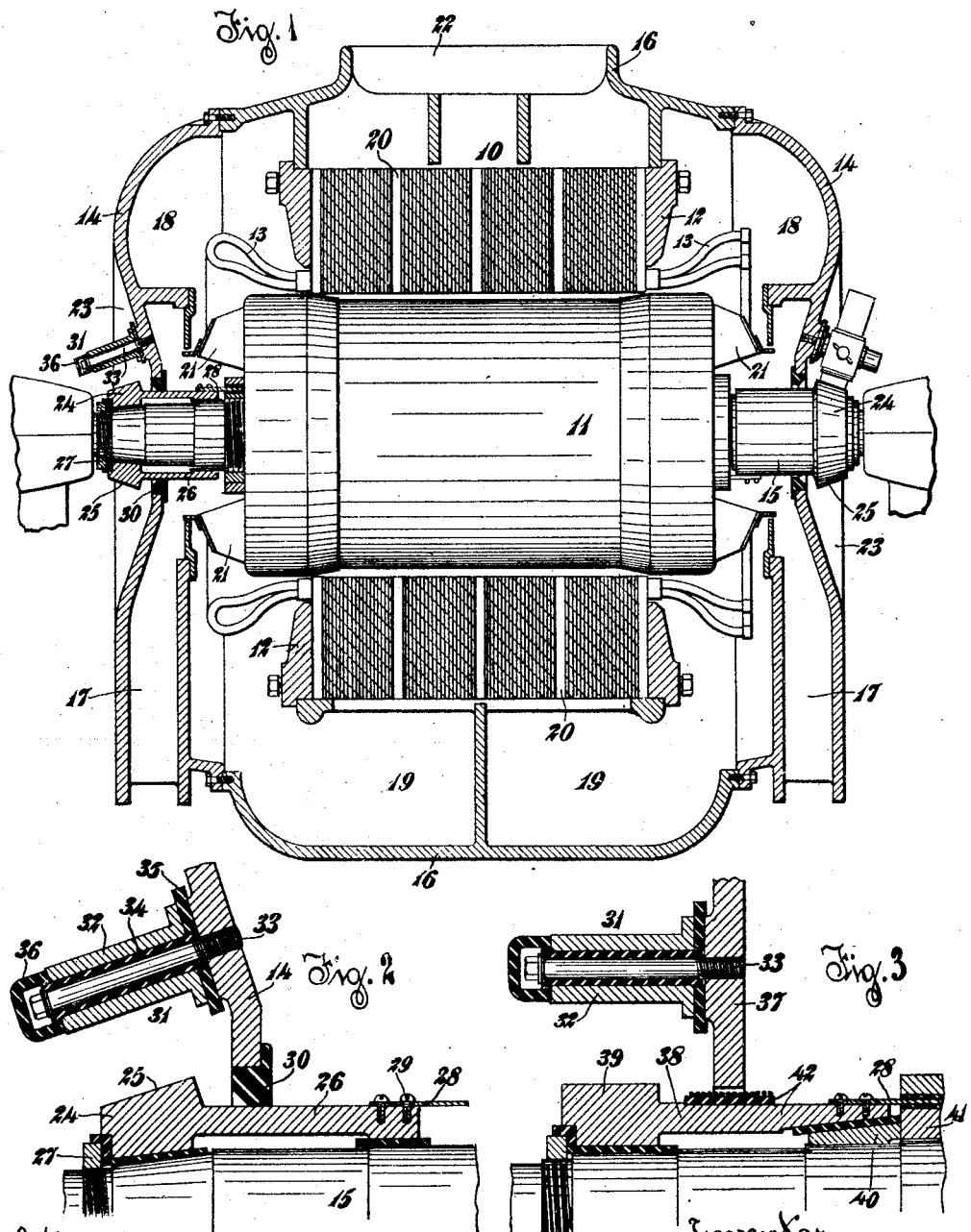

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO, JOINTLY.

INCLOSED DYNAMO-ELECTRIC MACHINE.

977,250.          Specification of Letters Patent.      Patented Nov. 29, 1910.

Application filed March 1, 1907. Serial No. 359,954.

*To all whom it may concern:*

Be it known that I, ALFRED H. WOUTERS, belonging to the Kingdom of the Netherlands, residing at Norwood, in the county of Hamilton and State of Ohio, have invented certain new and useful Improvements in Inclosed Dynamo-Electric Machines, of which the following is a full, clear, and exact specification.

My invention relates to dynamo-electric machines and particularly to machines of the inclosed high speed type such as turbo-alternators.

It is customary to inclose turbo-alternators in housings so that a large volume of air can be forced through the machine to prevent an excessive rise of temperature. The air is usually conveyed to the interior of the housing through admission chambers located at the ends thereof and having openings around the shaft. The collector rings are arranged at one or both ends of the machine on the outside of the housing so that access can be had to the brushes, the collector leads being supported along the shaft and carried through the shaft openings in the housing to the field winding. The result of this construction is that the collector rings are located a considerable distance from the field magnets, necessitating the use of long collector leads, and that the shaft bearings are located a considerable distance apart.

One of the objects of my invention is to provide means whereby the use of long collector leads which are rather difficult to support and insulate can be avoided in such machines.

A further object is to provide a structure of the above type having parts so constructed and arranged that there will be no loss or waste of space axially of the machine, in order that the length of the shaft and the distance between the bearings and consequently the flexibility of the shaft and the tendency for the rotating element to vibrate at high speeds will be as small as possible.

My invention consists in certain novel details of construction and combinations and arrangements of parts described in the specification and set forth in the appended claims.

For a better understanding of my invention reference is had to the accompanying drawing in which—

Figure 1 is a longitudinal sectional view through a machine equipped with my invention, portions being in elevation; Fig. 2 is an enlarged sectional view showing the collector ring or sleeve, a portion of the housing, and brush support; and Fig. 3 is a similar view showing a modification.

Referring now to the figures of the drawing I have shown at 10 the stator and at 11 the rotor of a turbo-alternator. The stator core consisting of laminæ clamped between end-plates 12 carries the usual stator winding 13. The machine is inclosed within a housing consisting of end-portions 14 provided with shaft openings through which the shaft 15 extends, and a main or central portion 16 which supports the stator core. The end portions of the housing are provided with air-admission chambers 17 which are open at the bottom and which communicate by circular air admission openings around the shaft with air-receiving chambers 18 and 19, the chambers 18 being at the ends of the housing and the chambers 19 being at the bottom and communicating with the chambers 18 and with the air-passageways 20 in the stator core. The main or central portion of the housing is provided with exhaust opening or chimney 22 through which the air escapes from the machine. When the machine is in operation, air is drawn by fans or blowers 21 on the rotor, through the admission chambers and forced into the receiving chambers, and through the air passageways 20 of the core and out through the chimney 22. The ends of the housing are inclined inward toward the shaft so as to form recessed or hollowed portions 23 the purpose of which will be explained.

Usually the collector rings are located on the outside of the housing walls, at one or both ends of the machine, and are connected to the rotor winding by long collector leads mounted on the shaft and insulated therefrom. In my improved constructions, I employ long collector rings or sleeves which have brush bearing portions on the outside of the housing walls and which extend through the housing walls to or adjacent to the ends of the rotor so that long collector leads are unnecessary.

In Figs. 1 and 2 the collector rings or sleeves are shown at 24. Each is provided with a brush bearing portion 25 located on the outside of the housing wall within the recessed portion 23 thereof, and with a cylindrical portion 26 extending through the shaft opening, into the housing nearly to the rotor. The brush bearing surfaces instead of being cylindrical as is customary are conical. In this case the inner and outer portions of the collecting rings or sleeves bear upon insulated portions of the shaft, and are clamped in position by nuts 27, the outer portion of the rings or sleeves and the corresponding portions of the shaft being inclined or conical. The rings or sleeves are connected to the winding (not shown) by comparatively short collector leads 28, which in this case are secured to the former by screws 29. The end walls of the housing through which the shaft extends are insulated from the collector rings or sleeves by insulating rings 30 which fit closely around the rings, just sufficient clearance being allowed to prevent contact between said parts.

The brush supports 31 are in this case mounted on the inclined end walls of the housing above the brush bearing surfaces of the collector rings or sleeves. Each brush support consists of a hollow sleeve 32 clamped to the housing wall by a bolt 33 screwed into a boss on the housing wall. The bolts 33 are inclined to the shaft, the axes of the bolts being parallel respectively to elements of the corresponding conical brush bearing surface of the rings. Each hollow sleeve 32 is insulated from its supporting bolt by an insulating sleeve 34 and from the housing by an insulating washer 35. The outer end of the sleeve and bolt are covered by an insulating cap 36 which is screwed onto the end of the sleeve.

In Fig. 3 I have shown a modification of the structure shown in Figs. 1 and 2. In this case the housing wall 37, or the portion of the wall adjacent the collector rings or sleeves 38 is vertical instead of inclined inwardly, and the brush supports mounted thereon are parallel to the axis of the machine instead of being inclined as in the construction first described. The collector ring or sleeve differs in several particulars from that first described. As in the first instance it extends through the shaft opening in the housing wall, the brush bearing surface 39 on the outer side of the wall being cylindrical, however, instead of conical. The collector ring or sleeve is supported at both ends as in the first described construction, the outer end resting on a cylindrical insulated portion of the shaft and the inner end on an inclined or conical sleeve 40 which is mounted on the shaft and bears against a nut 41 forming a part of the rotor structure. The collector ring or sleeve and the housing wall are insulated from each other in this case by an insulating sleeve or band 42 mounted on the former and held thereto by band wire.

The purpose and advantage of my improved structures will now be pointed out. By the long collector rings or sleeves which extend through the housing walls to the rotor, the use of long collector leads and supports and insulation for the same along the shaft are avoided. By inclining inward the end walls of the housing forming recessed hollowed portions for the brush bearing portions of the collector rings and by inclining the brush supports and the brush bearing surfaces of the collector rings, a considerable saving in space is effected and a more compact structure is obtained. By employing hollow brush supporting sleeves clamped by bolts to the housing as shown, the brushes can be arranged as near the housing as when the brush studs are supported on the bearing housing or in supports intermediate the bearing housing and the housing of the machine, and at the same time there is a direct saving in the space occupied by the supports for the brush studs. Consequently there will be less space between the bearings and a shorter and less flexible shaft can be employed.

I do not desire to be confined to the exact details shown but aim in my claims to cover all modifications which do not involve a departure from the spirit and scope of my invention.

What I claim as new is:—

1. In a dynamo-electric machine, a housing inclosing a stator and rotor thereof, a shaft extending through openings in the ends of the housing, the end walls of the housing being inclined inward around the shaft so as to form recessed portions, collector rings carried by said shaft and having brush bearing surfaces located within said recessed portions, and brush supports mounted on said housing.

2. In a dynamo-electric machine, a stator, a rotor, a housing inclosing said stator and rotor, a shaft extending through the openings in said housing, said housing having end portions provided with walls inclined inward around the shaft forming recessed or hollowed portions, collector rings having cone shaped brush bearing surfaces located within said recessed portions, and brush studs mounted on the inclined walls of the housing.

In testimony whereof I affix my signature, in the presence of two witnesses.

ALFRED H. WOUTERS.

Witnesses:
GEO. B. SCHLEY,
FRED J. KINSEY.